Patented Nov. 2, 1937

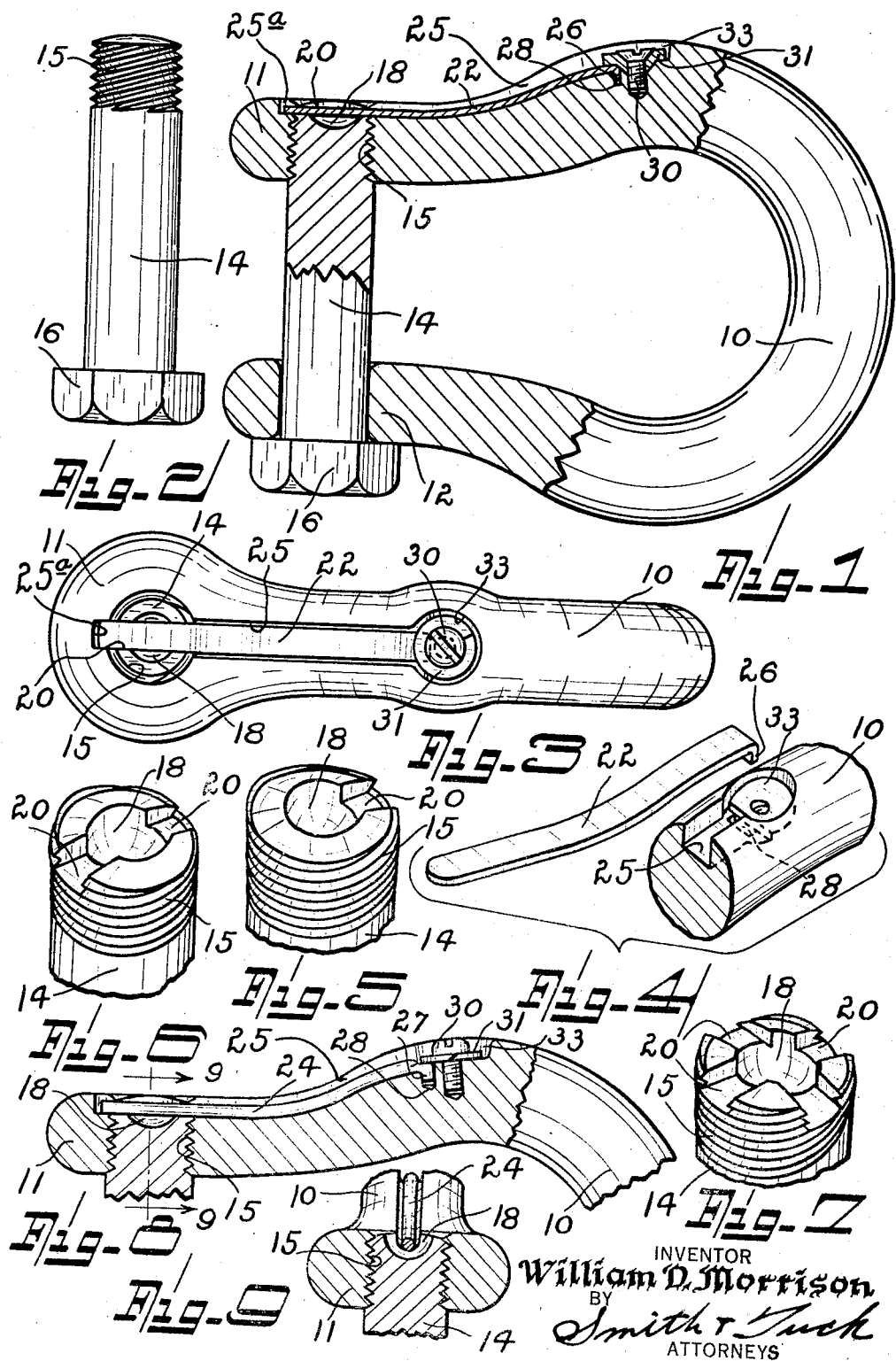

2,097,465

UNITED STATES PATENT OFFICE 2,097,465

LOCKABLE PIN SHACKLE

William D. Morrison, Seattle, Wash.

Application April 1, 1936, Serial No. 72,216

2 Claims. (Cl. 59—86)

My present invention relates to the art of shackles and more particularly to a lockable pin shackle.

Shackles have been used for many years without appreciable change. However, the development of power devices, having increased handling capacity, has created a real need for a shackle which can be depended upon under severe conditions of strain when, were it to spring open, it might be an item of serious danger to workmen and to valuable cargo. In hoisting, as in shipping, in industrial plants or in logging, shackles are often placed under heavy strain where they are also subject to vibration. They are oftentimes dragged through brush, and over rock ground and generally subjected to so much disturbance that the pin of the ordinary type of shackle is apt to become unscrewed from the same. On the other hand it is very desirable in the majority of such operations, to have a shackle that can be opened and closed quickly as many times a number of persons employed on the work are idle while such changes are being made. To overcome these conditions and to supply a device of maximum strength and speed of operation, I provide a shackle with the usual threaded pin but preferably provided with a plurality of threads so that a single turn will engage several threads, to the end that the pin may be screwed home quickly and yet will have the same eye resistance to spreading of the free ends of the shackle as does the standard single thread pin.

Other and more specific objects will be apparent from the following description taken in connection with the accompanying drawing, wherein Figure 1 is a plan view of a shackle made after the teachings of my invention, partly in section to better illustrate the construction thereof.

Figure 2 is an illustration of a multi-thread pin as used with my shackle.

Figure 3 is a top view of Figure 1 showing the locking means I employ to hold my shackle pin against unscrewing.

Figure 4 illustrates one form of securing means in perspective, the parts being shown in exploded relationship.

Figures 5, 6, and 7 show types of end constructions suitable for use with my shackle pin.

Figure 8 is a fragmentary view, similar in part to Figure 1, but showing the locking spring as made from spring wire instead of flat spring stock.

Figure 9 is a cross-sectional view along the line 9—9 of Figure 8.

Referring to the drawing, throughout which like reference characters indicate like parts, 10 designates the body member of my shackle. This may take any of the modified U-shape forms as indicated by the service for which it is intended. The two ends as 11 and 12 terminate in portions which are substantially parallel and enlarged to provide in 11 the threaded portion adapted to receive the threaded end of pin 14 and the lower member 12 is bored to take the body size of pin 14.

I prefer that pin 14 departs from the usual structure in that, instead of having a single thread at 15, a plurality of threads or multiple threads are used so that a fewer number of turns of the pin will be sufficient to seat it in adequate thread length to give the required strength. The lower, or head end, of pin 14 may take any desired form. In my present illustration I have shown it as provided with a hexagon head 16. In other instances it might be provided with the usual eye head, or it may take any other suitable form. For certain uses it might be provided with a head having a screw driver slot.

The threaded end of the bolt may be formed after any of the showings indicated in Figures 5, 6 or 7. Preferably, the extreme end is counterbored as at 18 and then provided with either a single notch as 20, illustrated in Figure 5, or a plurality of notches, as are illustrated in Figures 6 and 7. The purpose of counterbore 18 is to permit of placing some pointed tool underneath the locking spring 22 so that the same can be lifted out of notches 20 and thus permit the free turning of pin 14 when it is desired to remove it.

While I have shown, as a preferred form, pin 14 with a multiple thread at 15 it is believed it will be apparent that my locking arrangement would be just as successful if a single thread were to be used. In fact that might be a satisfactory solution even where speed of operation is important, if the thread was an enlarged one.

It has been found that if threads 15 are of steep pitch as will occur if a multiplicity of threads are used, or if a thread of greater pitch than standard for the diameter is used, the angle of thread increases the tendency for the pin to loosen, particularly under vibration or through interference by being dragged over rock or through brush, or the like. To overcome this condition I provide a locking spring member as 22 or 24 such as are illustrated successively in Figures 1 and 3 and in Figures 8 and 9. This spring I prefer to seat in a groove or depression 25 formed within the body of shackle member

10 so that the spring will lie well below the surface and thus be free from any interference or malfunctioning by shock, rocks, sticks or brush that might otherwise be driven under the same. In certain instances it is desirable for the groove 25 to extend beyond the bolt as indicated in Figures 1 and 3 at 25a so that the spring locking member as 22 or 24 may engage the same and make the locking more secure. The functioning of the two springs illustrated is identical whether they be flat or made of round stock. In either instance notches 20 should be so shaped as to accommodate the type of spring used.

While there may be many ways of securing the fixed end of the spring I have found it most desirable to bend the end of the spring down, as at 26 or 27, and engage the bent down portion in an opening, preferably a drilled or milled hole 28, cut in the body of shackle 10, reasonably close to the securing screw 30. Screw 30 should be provided with a washer 31, preferably of the locking type. A screw with an enlarged head would serve this purpose but if a washer is used one of the various locking types may be successfully employed and thus add to the general security of the device. Two types of screws and washers are indicated.

It is desirable that the washer used be not of excessive diameter so that the depression 33 can be kept well within the marginal contour of member 10. In order to avoid weakness in the shackle at this point it is desirable to provide additional metal where screw 30 is seated. This may be accomplished either by enlarging the diameter of the shackle at this point or it may be similarly accomplished by swelling the section in one direction as is suggested in Figure 3. The exact construction will be best indicated by the method of forming the shackles; for certain kinds of work the shackle may be cast of suitable material although normally they are preferably forged from iron or steel and, for certain specific purposes, from the special alloy steel. In the logging industries for instance, where it is desirable to have a hard material that will be resistant to abrasion and frictional wear, manganese steels are indicated.

The foregoing description and the accompanying drawing is believed to clearly disclose a preferred embodiment of my invention but it will be understood that this disclosure is merely illustrative and that such changes in the invention may be made as are fairly within the scope and spirit of the following claims.

I claim:

1. The combination with a shackle including a pair of substantially parallel ends each provided with an eye and one of said eyes having interior threads, of a pin for said eyes having an enlarged head at one end and a threaded portion at its other end for co-action with said threaded eye and having notches in the face of said threaded end and a central counterbore in said face, and means exterior of said shackle adapted to engage said notches and bridge said counterbore.

2. The combination with a shackle including a pair of substantially parallel ends each provided with an eye and one of said eyes having interior multiple threads, of a pin for said eyes having an enlarged head at one end and a multiple threaded portion at its other end for co-action with said threaded eye and having pairs of notches in the face of the threaded end and a counterbore in said face, and means exterior of said shackle adapted to engage a pair of said notches and to bridge said counterbore.

WILLIAM D. MORRISON.